United States Patent
Sandling et al.

[11] Patent Number: 6,129,336
[45] Date of Patent: Oct. 10, 2000

[54] BALL STEM SEAL

[75] Inventors: Michael J. Sandling, Loveland; Steven M. Kirk, Cincinnati, both of Ohio

[73] Assignee: Xomox, Cincinnati, Ohio

[21] Appl. No.: 09/008,190

[22] Filed: Jan. 16, 1998

[51] Int. Cl.[7] .............................. F16K 41/04; F16K 41/08
[52] U.S. Cl. .......................... 251/214; 277/514; 277/530; 137/312
[58] Field of Search ................................ 251/214, 315.01, 251/315.06; 277/514, 516, 529, 530, 558, 648; 137/312

[56] References Cited

U.S. PATENT DOCUMENTS

| | | | |
|---|---|---|---|
| 945,433 | 1/1910 | Allen | 251/214 |
| 3,043,324 | 7/1962 | Morgan | 251/214 |
| 3,186,681 | 6/1965 | Lowrey | 251/214 |
| 3,425,663 | 2/1969 | Priese | 251/214 |
| 3,443,816 | 5/1969 | Saleri et al. | 251/214 |
| 4,317,573 | 3/1982 | Karkkainen | 251/214 |
| 5,263,682 | 11/1993 | Covert et al. | 251/214 |
| 5,326,074 | 7/1994 | Spock, Jr. et al. | 251/214 |
| 5,375,812 | 12/1994 | Kent | 251/214 |
| 5,407,176 | 4/1995 | Nevrekar | 251/214 |

FOREIGN PATENT DOCUMENTS

| | | |
|---|---|---|
| 4104003 | 3/1992 | Germany . |
| 310794 | 11/1986 | Taiwan . |

OTHER PUBLICATIONS

Brochure from Pfannenschmidt GmbH Kugelhähne, KK–8–91.

German Patent Application entitled "Schaltwellendichtung", Nov. 1, 1996.

Primary Examiner—George L. Walton
Attorney, Agent, or Firm—Dinsmore & Shohl LLP

[57] ABSTRACT

A stem seal assembly comprises a stem having a top end and a bottom end. The stem is adapted to fit in a valve body and interface with the valving member. A ball segment integral to the stem has a top surface facing upwardly and a bottom surface facing downwardly. A first seal engages the top surface of the ball segment and the second seal engages the bottom surface of the ball segment.

15 Claims, 4 Drawing Sheets

BALL STEM SEAL

TECHNICAL FIELD

The present invention relates generally to valves, and more particularly to seals in valves. One preferred embodiment of the invention is a ball seal for a stem in a valve.

BACKGROUND OF THE INVENTION

Particularly in industrial settings, valves are used to carry and control a variety of gases, liquids and slurries over a wide range of temperatures and pressures. Many types of valves have emerged to meet the broad range of industrial applications, such as plug valves, ball valves, butterfly valves, gate valves, check valves, etc. Many valves are hand operated, while other valves have automated actuators to operate a valve from a remote location or to operate valves that are too large for human users to operate.

Most valves have a valving member (e.g. the plug in a plug valve, the ball in a ball valve, the disc in a butterfly valve, etc.), which is interposed in a flowpath. The valving member has an open position, which allows media to flow through the valve, and a closed position, which prevents media from flowing through the valve. Typically, a stem is used to move the valving member between its open and closed positions. The stem is usually connected to the valving member and extends out of the valve where it can be actuated, either manually or automatically.

Valves use one or more seals to control the media passing through the valve and prevent leakage. Leakage can be categorized as internal or external. Internal leakage refers to fluid flow around a seal and back into the flowpath. An example of internal leakage is a valve in the closed position that nevertheless permits some fluid flow through the valve. On the other hand, external leakage refers to leakage from inside the valve to the external environment. Because the very nature of valves is to control fluid flow, either type of leakage is naturally undesirable.

Stem seals are used to prevent external leakage around the stem. With today's increasing emphasis on emissions, the importance of effective stem seals are compounded. However, stem seals have many design parameters which complicate stem seal designs. For instance, in operation stems move (e.g. rotate), so a stem seal must be able to maintain its seal integrity during operation. Beyond normal operational movements, non-operational movements resulting from external forces (e.g. side loads, axial loads, etc.) are often experienced by stems. A stem seal design will preferably maintain its seal integrity when such non-operational movements are experienced. Thermal cycling is another design parameter. Since many valves undergo wide temperature swings during use, an ideal stem seal will preserve its sealing integrity through the dimensional changes that result in thermal cycling. Additionally, a stem will preferably maintain an external seal in high temperature environments, such as those experienced in fire conditions, which would consume many seal materials. Therefore, there is a need for a stem seal which can satisfy the foregoing design parameters.

SUMMARY OF THE INVENTION

Accordingly, an object of the invention is to provide an improved stem seal. Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One embodiment of the present invention is a stem seal assembly. A stem has a top end and a bottom end, and is adapted to fit in valve body and interface with a valving member within the valve body. A ball segment integral to the stem has a top surface facing upwardly and a bottom surface facing downwardly. A first seal engages the top surface of the ball segment and a second seal engages the bottom surface of the ball segment. Preferably, the stem includes a cylindrical portion located above the ball segment and further comprises a third seal for engaging the cylindrical portion.

Another embodiment of the present invention is a valve assembly. A body has an inlet, an outlet, a flow path extending between the inlet and outlet. A stem port extends between the outside of the body and the inside of the body. A valving member, such as a plug, a ball or a disc, is moveably disposed in the flow path and has an open position and a closed position. At least one in-line seal is interposed between the body and the valving member. A stem is located in the stem port. The stem has an upper end, a lower end engaged with the valving member, a top spherical segment, and a bottom spherical segment having the same radial origin as the top spherical segment. A first stem seal is interposed between the top spherical segment and the body. A second stem seal contacts the bottom spherical segment.

Yet another embodiment of the present invention is a stem seal assembly. A stem has a proximal end, a distal end and an axis of rotation. An imaginary plane normal to the axis divides the stem into a proximal section and a distal section. A first spherical segment on the distal section of the stem is defined by rotating a first arc about the axis. The first arc has a radius originating from the intersection of the plane and the axis and extends between a first and second acute distal angles relative to the axis. A first seal engages the first spherical segment. The second spherical segment on the proximal section of the stem is defined by rotating a second arc about the axis. The second arc extends between a first and second acute proximal angles relative to the axis. The radius of the second arc originates from the intersection of the plane and the axis, and preferably is equal to the radius of the first arc. A second seal engages the second spherical segment.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Figure 1:
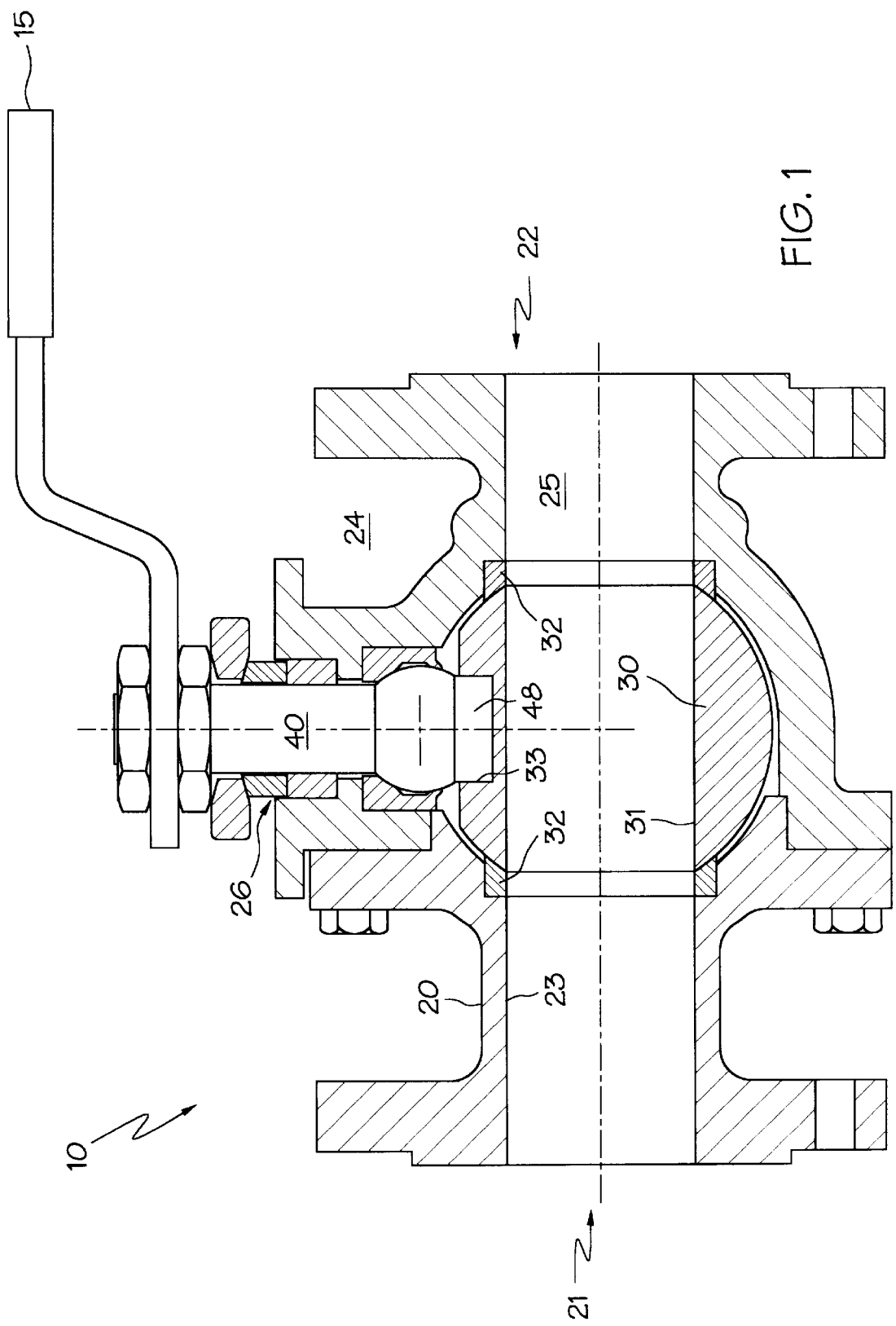
FIG. 1 depicts a valve assembly.

FIG. 1 depicts a valve assembly 10. For the purposes of illustration, the invention will be demonstrated in conjunction with a ball valve, however, the invention also has utility with other valve configurations, including plug valves, butterfly valves, and other rotary valves. The valve assembly 10 includes a valve body 20 formed from two halves bolted together. The body 20 has an inlet 21, an outlet 22, and a flow path 23 extending between inlet 21 and the outlet 22. The body 20 also includes a stem port 26 that extends between the outside 24 and inside 25 of the body. Extending through the stem port 26 is the stem 40, which acts as a mechanical link between the actuator 15 and the valving member 30. As shown here, the actuator 15 is a manually activated handle, however, automated actuators driven by electricity, pressurized fluid, springs or the like can also be used. In this embodiment, the valving member 30 is a ball, having a port 31 extending through the valving member. Internal seals 32 are interposed between the body 20 and valving member 30, and are designed to prevent internal leakage.

The valving member 30 is rotatably disposed in the flow path 23 and has an open position and a closed position. As shown in FIG. 1, the valving member 30 is in its open position where the port 31 is aligned with the flow path 23. In the open position, fluid communication exists between the inlet 21 and the outlet thereby allowing media to flow through the valve 10. The valving member interface 48 of the stem 40 connects to and engages with the stem interface 33 of the valving member 30. In one embodiment, the interfaces 33, 48 form a slotted slider coupling which allow rotational movement of the stem 40 to be translated to the valving member 30. The slider coupling has th e advantage of being able to translate torque even if the stem 40 and valving member 30 are out of vertical or axial alignment. When the actuator 15 is rotated 90°, that rotation is translated to the stem 40 which in turn is translated into the valving member 30, thereby closing the valve assembly 10. In the closed position, the port 31 is out of alignment with the flow path 23, thus blocking media flow between the inlet 21 and the outlet 22.

Figure 2:
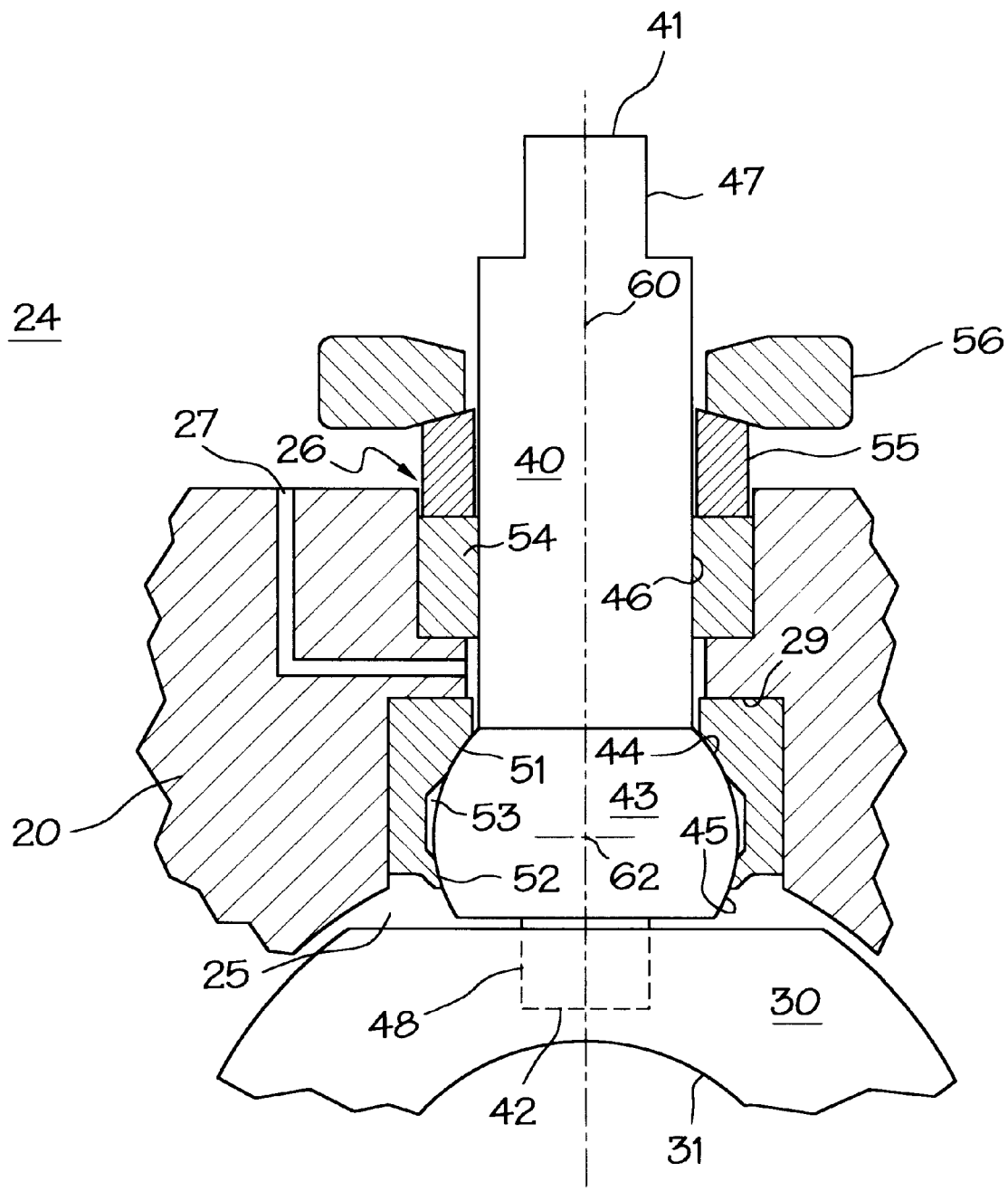
FIG. 2 depicts a detailed view of a stem seal with an optional leak detection port.

FIG. 2 illustrates a detailed view of the stem seal assembly portion of the valve assembly 10. The stem 40 has been rotated 90° to illustrate the valving member 30 in the closed position. The actuator 15 is removed from the stem to illustrate the actuation interface 47 of the stem 40. This view of the stem 40 also illustrates the dimensioning of the valving member interface 48, which forms the male member of the slider coupling between the stem 40 and the valving member 30. The stem 40 has an upper or distal end 41 located outside the body 20 and the lower or proximal end 42 located inside the body 20. The upper end 41 is located outside the body 20 in the sense that the upper end 41 is not exposed to the pressurized line media within the valve. The stem seal assembly is used to prevent external leakage from any pressurized line fluid from the inside of the valve 25 to the outside of the valve 24.

The ball segment 43, which is preferably integral with the stem 40, has a top surface 44 facing upwardly and a bottom surface 45 facing downwardly. The top surface 44 of the ball segment 43 is a spherical segment having a radial origin 62. The term "radial origin" refers to the point from which a radius originates. Likewise, the bottom surface 45 is also a spherical segment having the same radial origin 62 as the top surface 44. Since the top and bottom surfaces 44, 45 are part of the same ball segment, the radii of the surfaces 44, 45 are equal. Preferably, the top and bottom surfaces 44, 45 are continuous, as shown in FIG. 2.

In geometric terms, the stem 40 has an axis of rotation 60 extending between the proximal end 42 and the distal end 41. An imaginary plane normal to the axis 60 intersects at point 62 and divides the stem 40 into a proximal section and a distal section. A first spherical segment, corresponding to the top surface 44, is on the distal section of the stem 40. The first spherical segment 44 is defined by rotating an arc about the axis 60. This arc has a radius originating from the intersection of the plane and the axis (i.e., the radial origin 62) and extending between the first and second acute distal angles relative to the axis 60. A second spherical segment, corresponding to the bottom surface 45, is on the proximal section of the stem 40. The second spherical segment 45 is defined by rotating a second arc about the axis 60. The second arc extends between first and second acute proximal angles relative to the axis 60. The second arc has a radial origin 62 originating from the intersection of the imaginary plane in the axis 60. Preferably, the second arc has a radius equal to the first arc.

The top seal 51 sealing engages the top surface 44 of the ball segment 43 and the bottom seal 52 engages the bottom surface 45 of the ball segment 43. Preferably, the top and bottom seals 51 and 52 are integral to a singular seal insert 50 formed from a continuous material, which is preferably made from a fluoroplastic material, such as polytetrafluoroethylene ("PTFE"), fluorinated ethylene propylene ("FEP"), perfluoroalkoxy ("PFA"), and the like. Other materials such as graphite, ceramics, powdered metals, metal, high temperature plastics, and the like could also be used as the top and/or bottom seals. An annulus 53 is radially bound between the ball segment 43 and the seal insert 50 and axially bound by the top and bottom seals 51, 52.

During assembly, the seal insert 50 is first placed in the stem port 26 and seated against the shelf 29. The upper end 41 of the stem is then passed up through the seal insert 50 and through the stem port 26, until the upper surface 44 touches the bottom seal 52. Alternatively, the seal insert 50 is seated against the ball segment and the assembly is inserted up through the stem port 26. An interference exists between the ball segment 43 and the bottom seal 52. The ball segment is dimensioned such that the stem 40 can be forced upwards to radially displace the bottom seal 52 until the upper surface 44 engages the upper seal 51. The bottom seal 52 is resilient enough to flex back to engage the bottom surface 45. Alternatively, the radius of the ball segment could be reduced or flattened between the upper and the bottom surfaces 44, 45 to lessen the interference between the bottom seal 52 and the ball segment 43 during assembly.

In operation, pressure from the inside of the valve 25 will exert an upward force against the stem 40. This upward force will be countered, at least in part, by a downward force from the shelf 29 passing through the seal insert 50, which in turn acts in the upper surface 44. These forces encourage a fluid tight seal between the upper surface 44 and the upper seal 51 and the shelf 29 and the seal insert 50. In other words, this seal is pressure assisted. Further, as the internal valve pressure increases, the upper seal 51 load increase proportionately, thus increasing the seal integrity around the stem 40. The bottom seal 52 is preferably a pressure assisted lip. The pressure from the inside 25 of the valve will induce a load against the bottom seal 52, which will be countered by a normal load from the bottom surface 45. This load and counter load will encourage a fluid tight seal between the bottom seal 52 and the bottom surface 45. Since the bottom seal 52 is pressure assisted, the seal integrity will proportionately increase as the internal valve pressure increases. The pressure assisted seals 51, 52 are particularly useful where the stem will experience the full line pressure, such as in floating ball valves, plug valves, butterfly valves, gate valves, and the like.

Since the seals 51, 52 are symmetric about the axis of rotation 60, the stem 40 can rotate relative to the body 20 while preserving the sealing integrity through the stem port 26. The stem seal will also be preserved during non-operation movements in the form of a downward displacement of the stem 40 relative to the body 20. While an extreme downward load may separate the upper surface 44 from the upper seal 51, the sealing load between the bottom seal 52 and the bottom surface 45 will increase due to the increased radial interference between the ball segment 43 and the bottom seal 52, thus preserving the seal integrity around the ball segment 43.

The stem 40 further comprises a cylindrical portion 46 located above the ball segment 43. The stem packing 54 is interposed between the cylindrical surface 46 and body 20 to provide a third seal for preventing external leakage in the valve. The stem packing is compressed by the rigid gland 55 which receives a downward load from the gland follower 56. The downward load can be generated in a variety of suitable ways, such as a bolted connection to the body 20, a threaded connection to the stem 40, spring washers, and the like.

The dimensioning of the ball segment 43 can be expressed relative to the dimensioning of the cylindrical portion 46 in terms of a ratio between the two radii (i.e., ball segment radius: cylindrical portion radius). Preferably, the ratio is from 1:1 to 3:1, more preferably from 1.2:1 to 2.0:1, and most preferably from 1.3:1 to 1.6:1. For instance, one embodiment of the invention used in a 2 inch ball valve has stem with a ball: cylinder ratio of 1.43.

Optionally, a leak detection port 27 extends from the outside of the valve 24 to an annulus between the stem packing 54 and the upper seal 51. The leak detection port 27 is used to determine whether any leakage occurs around the seals 51 and 52. If no such leakage is detected, the stem packing 54 can be removed and replaced without depressurizing the valve 10, thus facilitating in-line stem packing replacement. As one with ordinary skill in the art will readily appreciate, appropriate safety precautions should be adhered to and appropriate safety equipment should be used, particularly where the line media is potentially dangerous, before an in-line stem packing replacement is attempted. Ordinarily, the leak detection port 27 would be capped or blocked to prevent any potential leakage during normal operation through the leak detection port 27.

Figure 3:
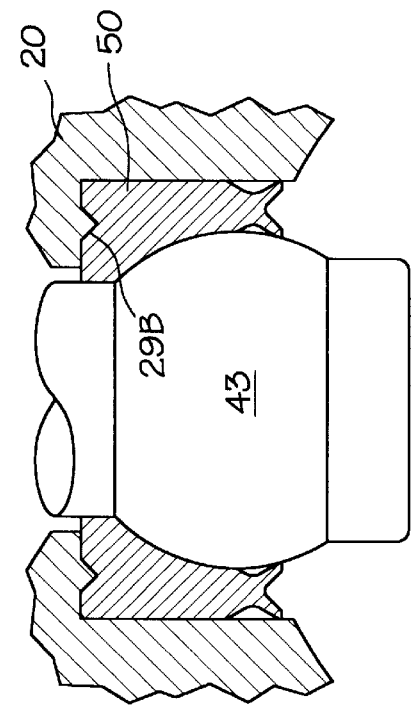
FIG. 3 illustrates an alternative stem seal configuration.

FIG. 3 depicts another embodiment of the sealing configuration around the ball segment 43. A pressure assisted lip 52 engages the bottom surface 45. A second pressure assisted lip 58 engages the body 20, which reinforces the seal integrity through the stem port 26 against the body. The thermal cycling shelf 29A extends radially outward and axially upward to form a tapered surface. As the valve 10 experiences thermal cycling, the ball segment 43 and the body 20 may expand or shrink at different rates. The angled shelf 29A will assist in preserving seal integrity between the seal 50 and the body 20 during such thermal cycling. For instance, should the body 20 expand at a rate greater than the stem 40, the load between the seal insert 50 and angled shelf 29A will increase. At the same time, the upward load on the stem due to the pressure differential from the inside 25 to the outside 24 of the valve will maintain seal load against the upper spherical segment 44.

Figure 4:
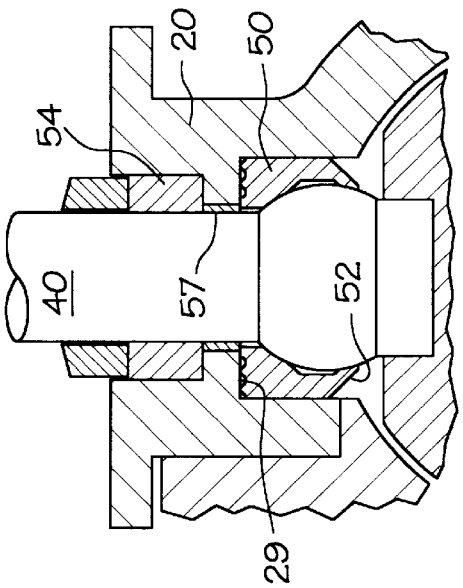
FIG. 4 illustrates an alternative stem seal configuration.
Figure 5:
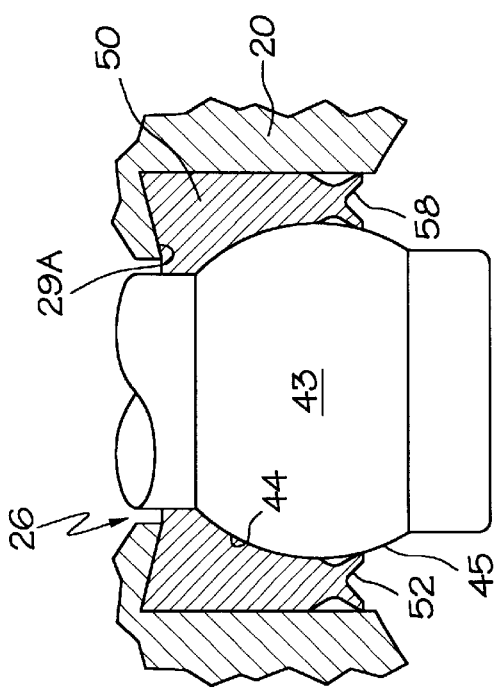
FIG. 5 illustrates an alternative stem seal configuration.
Figure 6:
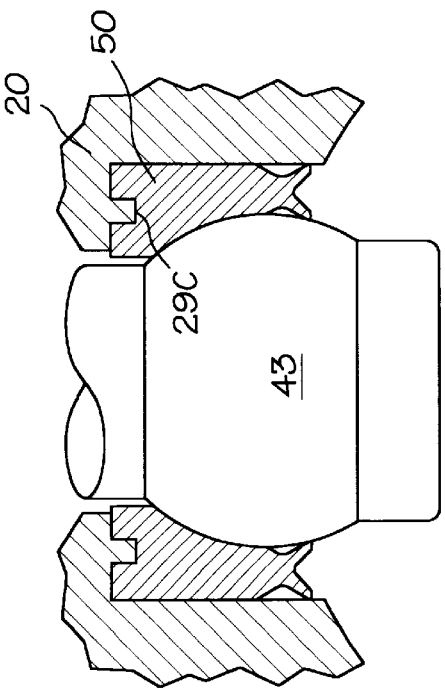
FIG. 6 depicts a stem seal with an optional stem bearing.

FIG. 4 depicts an alternative thermal cycling shelf 29B, which operates in the same manner as the shelf 29A, but takes a cross-sectional form of a downwardly pointing triangle. FIG. 5 depicts yet another thermal cycling shelf 29C having a rectangular cross-sectional shape. FIG. 6 illustrates an optional stem bearing 57 interposed between the stem 40 and the body 20, which is located between the stem packing 54 and the seal insert 50. The stem bearing 57 used to maintain the axial alignment of the stem 40 relative to the body 20. One or more bearings can be located anywhere along the stem. The seal insert 50 depicted in FIG. 6 includes a ridged surface which interfaces with the shelf 29, and also includes a chamfer extending from the bottom seal 52 to the body 20.

Figure 7:
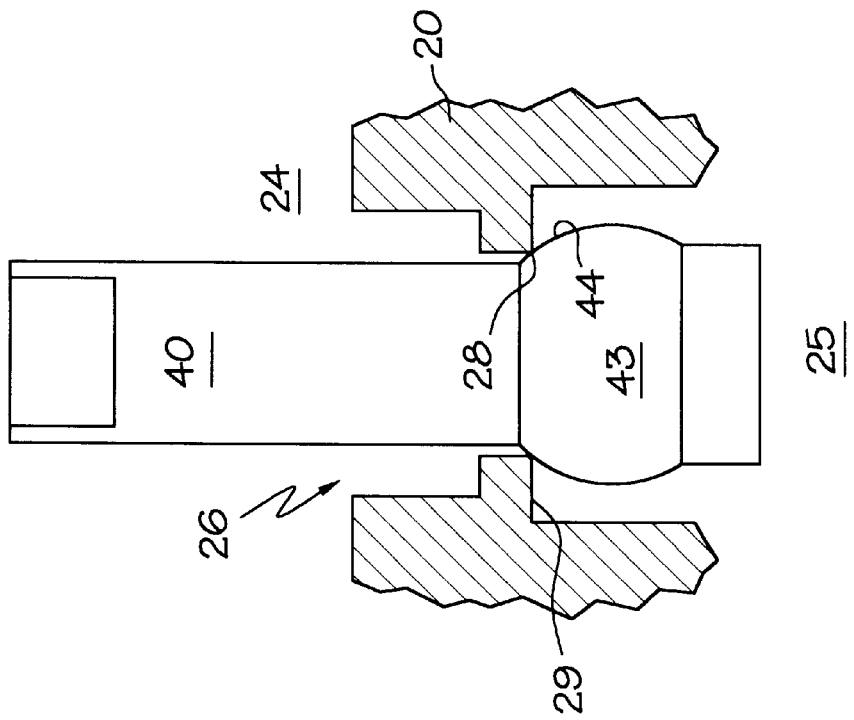
FIG. 7 demonstrates a non-operational movement resulting from a side load.

FIG. 7 illustrates how the seal integrity between the top and bottom seals 51 and 52 and the ball segment 43 are preserved during non-operational movements resulting from side loads. The phantom displacements 49 of the stem 40 is exaggerated to show movement of the stem reacting to a side load. Since the top and bottom spherical segments 44 and 45 both originate from the same radial origin, the seal integrity against the ball segment 43 is preserved.

Figure 8:
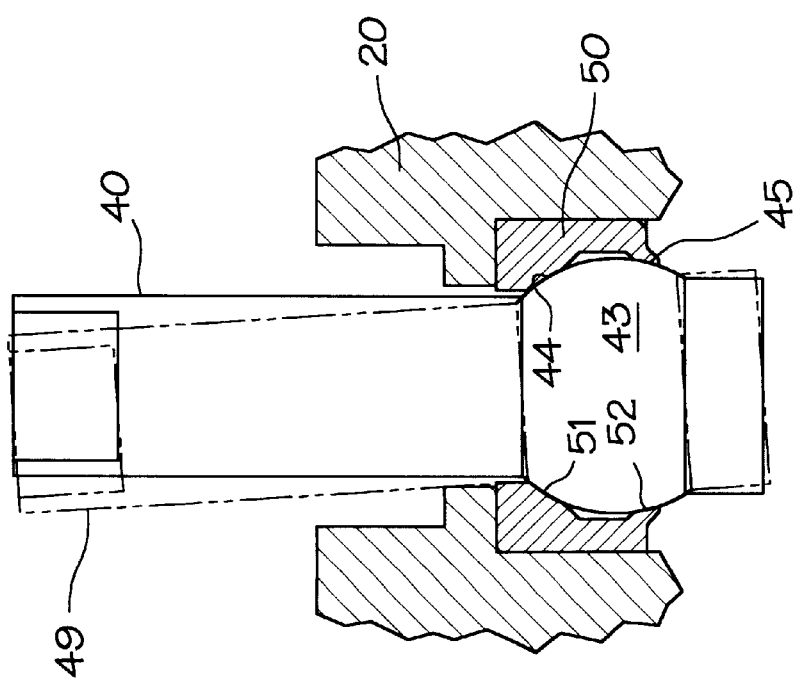
FIG. 8 depicts a metal to metal seal in the event the seal insert is consumed.

FIG. 8 illustrates the dimensional interference between the ball segment 43 and the stem port 26 which prevent the stem from becoming liberated from the body 20. The stem port 26 is dimensioned such that at least a portion has a smaller radius than the top spherical segment 44 of the ball segment 43. FIG. 8 also illustrates a metal to metal seal which will result should the seal insert 50 be consumed, which may occur in high temperature environments such as in a fire. With the seal insert 50 consumed, the pressure differential from the inside 25 to the outside 24 of the valve will force the stem 40 upwardly. The edge 28 of the shelf 29 engages the top spherical segment 44 to provide a metal to metal seal which prevents external leakage. Preferably, the edge 28 will have a slight chamber or radius to improve the seal interface with the upper surface 44.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

We claim:

1. A stem seal assembly, comprising:
   a) a stem having a top end and a bottom end, said stem being adapted to fit in a valve body and interface with a valving member;
   b) a ball member integral to the stem, said ball member having top surface facing upwardly and a bottom surface facing downwardly; and c) an integral seal insert having a first seal portion engaging the top surface of the ball member and a second seal portion engaging the bottom surface of the ball member whereby the stem may deflect radially about the ball member while preserving the seal integrity between the seal insert and the ball member.

2. A stem seal assembly as recited in claim 1, further comprising a cylindrical portion on the stem, and a third seal engaging said cylindrical portion, said cylindrical portion being located above the ball member.

3. A stem seal as recited in claim 1, further comprising an annulus radially bound by the ball member and the seal insert and axially bound by the first and second seal portions.

4. A stem seal assembly as recited in claim 1, wherein the second seal portion comprises a pressure assisted lip.

5. A stem seal assembly as recited in claim 1, further comprising a pressure assisted lip for sealing against a valve body.

6. A valve assembly, comprising:
 a) a body having
  (i) an inlet, and outlet and a flow path extending between the inlet and outlet, and
  (ii) a stem port extending between the outside of the body and the inside of the body;
 b) a valving member movably disposed in the flow path having an open position and a closed position;
 c) at least one in-line seal interposed between the body and the valving member;
 d) a stem located in the stem port, said stem having
  (i) an upper end,
  (ii) a lower end engaged with the valving member,
  (iii) a top spherical segment, and
  (iv) a bottom spherical segment having the same radial origin as the top spherical segment; and
 e) a seal insert formed from a continuous material, the seal insert comprising
  (i) a first stem seal interposed between the top spherical segment and the body and sealingly engaging the top spherical segment, and
  (ii) second stem seal sealingly engaging the bottom spherical segment;

whereby the stem can tilt radially about the radial origin of the top and bottom spherical segments in response to side loads while preserving the sealing engagement of the first and second stem seals.

7. A valve assembly as recited in claim 6, further comprising a cylindrical surface on the stem located above the spherical segments and a third stem seal interposed between the cylindrical surface and the body.

8. A valve assembly as recited in claim 7, further comprising a leak detection port in the body located between the first and third stem seals.

9. A valve assembly as recited in claim 8, further comprising a stem bearing around the cylindrical surface.

10. A valve assembly as recited in claim 6, wherein the second stem seal is a pressure assisted lip.

11. A valve assembly as recited in claim 6, wherein at least a portion of the stem port is smaller than a portion of the top spherical segment, said portion of the stem port being located above the top spherical segment.

12. A valve assembly as recited in claim 6, wherein the stem port is dimensioned such that in the event the first stem seal is consumed, the top spherical segment will engage the body to form a metal to metal seal.

13. A valve assembly as recited in claim 6, further comprising a thermal cycle shelf on the body adjacent the first stem seal.

14. A valve assembly as recited in claim 6, wherein the valving member is a ball in a ball valve, a plug in a plug valve, or a disc in a butterfly valve.

15. A valve assembly as recited in claim 6, wherein the top and bottom spherical segments have the same radius.

* * * * *